United States Patent [19]

Moran

[11] 4,320,077

[45] Mar. 16, 1982

[54] METHOD AND APPARATUS FOR HEATING LENGTHS OF THERMOPLASTIC MATERIAL

[76] Inventor: Thomas F. Moran, 540 Cobblestone, Aurora, Ohio 44202

[21] Appl. No.: 213,853

[22] Filed: Dec. 8, 1980

[51] Int. Cl.³ .............................................. B29C 17/02
[52] U.S. Cl. .................................. 264/40.6; 219/311; 219/438; 219/441; 219/328; 264/295; 264/322; 264/339; 219/439; 219/530; 219/535; 432/10
[58] Field of Search ...................... 13/22, 33, 311, 328; 219/430, 535, 437, 438, 439, 441, 530, 543, 540, 429; 432/234, 10; 264/40.6, 294, 295, 322, 339, 337, 519, 521

[56] References Cited

U.S. PATENT DOCUMENTS

| | | | |
|---|---|---|---|
| 3,092,704 | 6/1963 | DeWoody et al. | 219/438 X |
| 3,177,341 | 4/1965 | DeWoody et al. | 219/385 |
| 3,280,304 | 10/1966 | Shinohara et al. | 219/441 |
| 3,384,695 | 5/1968 | Murray | 264/295 X |
| 3,806,701 | 4/1974 | Scott | 219/438 |
| 3,940,589 | 2/1976 | Tupper | 219/441 X |
| 3,969,610 | 7/1976 | Ratti et al. | 219/441 |
| 3,984,656 | 10/1976 | Morgan | 219/439 |
| 4,039,777 | 8/1977 | Balcu | 219/439 |
| 4,079,104 | 3/1978 | Dickson et al. | 264/327 X |
| 4,081,504 | 3/1978 | Wenrick et al. | 264/339 X |

Primary Examiner—Volodymyr Y. Mayewsky
Attorney, Agent, or Firm—Pearne, Gordon, Sessions, McCoy & Granger

[57] ABSTRACT

The method and apparatus disclosed herein provide a stratified heat bath for use in the heating stage of thermoplastic deformation. It allows for heating of central sections of the thermoplastic lengths in order to render said lengths susceptible to deformation without heating the end sections or tangents of said lengths, permitting the ends to retain their original shape. In the case of tubular lengths, such as lengths of PVC pipe, the invention provides for more rapid heating than in the prior art.

11 Claims, 6 Drawing Figures

METHOD AND APPARATUS FOR HEATING LENGTHS OF THERMOPLASTIC MATERIAL

BACKGROUND OF THE INVENTION

This invention relates to a method and apparatus for deforming thermoplastic material and, more specifically, to a method and apparatus for heating lengths of thermoplastic material without heating the ends of said lengths.

The typical deformation process for thermoplastic tubing and pipe and other items of elongated thermoplastic material requires that the tubing be heated at the section where deformation is desired. Once heated, the tubing may be readily bent or deformed on a jig or a form or other mechanical device and then cooled and set.

Prior heating methods have included totally immersing the tubing in heated "oil" baths. However, deformation is often desired in only a section of the tubing, such as in the manufacture of elbows for use in electrical conduit, in which bends are desired in the middle of the tubing while the ends remain unbent, retaining their generally cylindrical shape in order to permit standard connectors to fit over the ends. It is then desirable that only the section of the tubing to be deformed be heated, while the ends remain relatively cool. With this and related methods, the bath was substantially at a uniform temperature and thus the entire length was heated. This method was frequently undesirable since the entire length of tubing, including the ends, became susceptible to sags and bends and other types of deformation.

Other prior heating methods have included heating the tubing under an infrared lamp and simultaneously rolling the tubing to make heating uniform and to avoid undesirable deformation. This process had the advantage of heating only sections of the tubing while the ends could remain unheated, but it was disadvantageous for hollow thermoplastic tubing or pipe in that only the outside of the tubing or pipe was heated directly. It would be much more advantageous to heat pipe or tubing from both the inside and the outside, since the process would then be speeded up greatly. Furthermore, if the tubing was left too long under the infrared lamp, the plastic was likely to be burned.

Still other prior processes for heating tubing have included spraying the tubing with hot "oil" and simultaneously rolling the tubing. While this rendered the tubing less susceptible to burn damage, it was still a slow process since, again, only the outside was heated directly.

SUMMARY OF THE INVENTION

The present invention solves these and other problems by providing a method and apparatus for heating lengths of thermoplastic material in which central sections of the lengths are heated without substantially heating the end sections of the lengths. The apparatus of the present invention comprises a container open at its top end and closed at its bottom end; a fluid medium at least partially filling the container to a first level, said medium having a boiling point substantially higher than the softening point of the thermoplastic material, and which is chemically inert with respect to the thermoplastic material and which, once heated, will retain its heat for the period of time necessary to adequately heat the thermoplastic; an annular heat band attached to the outside of said container at a second level below the first level of the medium in the container; and an external enclosure for said container comprised of thermally insulating material.

The method of the present invention comprises the steps of filling a container at least partially to a first level with a fluid medium, attaching a heating band to the outside of said container at a second level, externally enclosing at least a portion of said container in an insulating enclosure, applying heat to said container at the second level by means of said heating band, inserting a length of thermoplastic material into said container from the top when a stratum of heated medium between the first and second levels arrives at a desired temperature until the section of said length to be heated is located substantially in said stratum with one end of said length above the first level of said medium and the other end in the medium below the second level of the heat band, and withdrawing said length when it has been heated sufficiently. When the length has been withdrawn, it may then be bent by suitable mechanical means, such as placement on a fixture of suitable form, and then cooled so as to reset in the desired configuration.

With the method of the present invention, only the fluid medium at about the level of and above the heat band will be heated, while the fluid medium below the band will remain relatively cool. As the heat is applied, the fluid medium at the level of the band will become hotter and less dense. The cooler, denser fluid above the band will tend to sink, displacing the hot fluid, which will then rise to the level above the band. Some heat will escape to the outside air to be quickly dissipated by air currents, keeping the air above the bath relatively cool with respect to the bath.

As a result, only the section of the length which is located in the fluid medium at about the level of and above the level of the heated band will be heated, while the end of the length below the heat band and the end remaining outside the bath will remain relatively cool. The ends, therefore, of the thermoplastic lengths will remain unheated and will not tend to deform. Only the portion where the bend is desired will be susceptible to deformation. If the length is tubular, since it is inserted directly into the bath, both the inside and the outside of the heated section will be heated uniformly, speeding up the process considerably.

With the present invention, it is possible to heat lengths of thermoplastic material only at a section where a bend or other deformation is desired without substantially heating the ends of said lengths. It is also possible to heat a length of thermoplastic tubing or pipe at the section where a bend or other deformation is desired at a faster rate than with the method or apparatus provided in the prior art. The invention is not limited to any particular type of thermoplastic material, but may be used with many thermoplastic materials, such as PVC, ABS, polypropylene, polyurethane, and others, and may be used to effect bends of substantially any radius or circumference upon lengths of substantially any length and diameter.

DETAILED DESCRIPTION OF THE DRAWINGS

Figure 1:
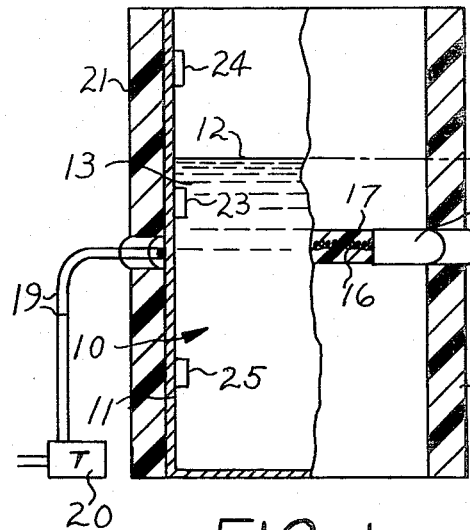
FIG. 1 is a side elevational view, partially in section, of the apparatus showing the heating band in place and attached to the outside of the container, applying heat to the fluid medium at the level of the heating band.

FIG. 1 shows a preferred embodiment of the apparatus of the invention used to practice the method of the invention. A bath 10 is provided in a container 11, such as a 55-gallon drum, and at least partially filled to a top level 12 with a fluid medium 13, such as triethylene glycol or glycerine, which have a boiling point substantially higher than the softening point of the thermoplastic material to be heated, which is chemically inert with respect to the thermoplastic material, and which, once heated, will retain its heat for the period of time necessary to adequately heat the thermoplastic material. The container 11 is left open at its top end.

An annular heat band 15 preferably comprising an electric heating coil 16 surrounded by a layer of electrically insulating material 17 is attached to the outside of the container 11 at a level 18 below the level 12. The heat band 15 has attached wiring 19 connecting it to an electrical power source through a conventional transformer 20. The container 11 is then externally lined with a thermally insulating material 21.

The heat band 15 is not limited to an electrical coil-type heat band. Other possible heat bands include bands of circulating hot fluid, such as oil or steam, enclosed by a thermally resistant and conductive material where the heat is provided by an external heating and pumping mechanism, and chemical heat bands where the heat is provided by chemical reaction of a plurality of agents enclosed together in a thermally resistant and conductive material.

When the heat band 15 is properly connected and the power source activates the transformer 20, the heat from the coil in the band 15 is communicated to the fluid medium 13 through the walls of the container 11 at the level 18 of the heat band. As the heat is communicated to the fluid medium 13, the fluid at the level 18 of the band becomes hotter and less dense. The cooler, denser fluid above the level 18 will tend to sink, displacing the hot fluid, which will then rise to the level 12, so that the fluid between the levels 12 and 18 is heated to a desired uniform temperature, forming a heated fluid stratum 22.

Heat monitoring means 23 for the fluid medium 13, such as a thermometer or a thermostat, may be attached between the level 18 of the heat band and the level 12 of the fluid to measure the heat in the heated stratum 22 and to ensure that said stratum maintains a desired temperature. Similar heat monitoring means 24 and 25 may be attached above the level 12 of the fluid and below the level 18 of the heat band to ensure that the upper and lower strata are remaining sufficiently cool.

For heating polyvinyl chloride (PVC) pipe, the desired temperature of the heated stratum 22 of fluid between the levels 12 and 18 is around 350° F. The fluid below the level 18 will remain relatively cool, although some heat will inevitably be conducted and radiated downward. For example, once the heated stratum 22 is at 350° F., the heat of the lower stratum below the level 18 will typically stabilize at around 175° F. Some heat will conduct or radiate into the air above the bath 10, but since the top is left open, it should quickly be dissipated by outside air currents, keeping the environment above the bath relatively cool with respect to the heated fluid. If overheating of the air above the bath 10 or of the fluid below the level 18 becomes a problem, the portions of the thermally insulating material 21 above the level 12 and below the level 18 may be dispensed with, and the band 15 and the container 11 may be thermally insulated only between the level 18 of the band to the level 12 of the fluid.

Once the fluid medium 13 has attained the desired temperature, the method of the invention provides that a length of thermoplastic material be introduced into the bath by inserting the length downwardly from the top of the bath until the section which is to be heated is located substantially within the stratum of the heated fluid defined between the levels 12 and 18.

Figure 2:
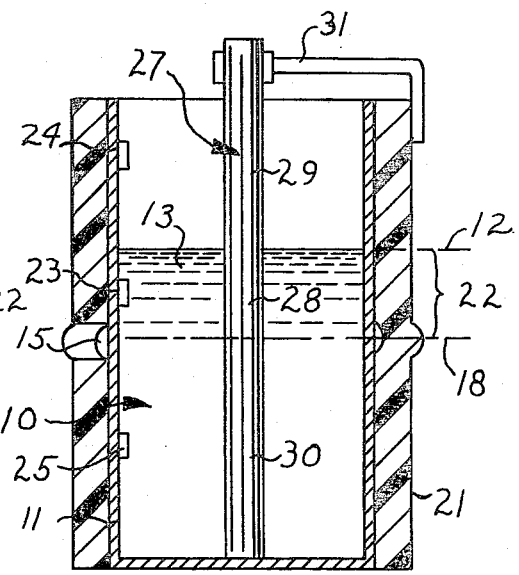
FIG. 2 is a sectional view of the apparatus of FIG. 1, which shows the placement of the length in the bath so that the portion to be heated is in the medium at and above the level of the band.

FIG. 2 shows a bath 10 in which the stratum 22 of heated fluid is at 350° F. and into which a length of PVC tubing 27 has been so inserted. It is desirable to heat the central section 28 of the tubing 27 while the sections 29 and 30 at each end are to remain relatively cool. The invention makes this result possible by the proper selection of the level 12 of the fluid in the bath and the level 18 of the heating band. The levels 12 and 18 must be selected so that the distance between the two is equal to the length of the central section 28 of the tubing to be heated, subject to the constraint that sufficient room must be left in the bath below the heat band 15 to allow the end section 30 to be totally immersed. The levels 12 and 18 are preferably selected so as to allow the tubing 27 to rest on the bottom of the container 11 and remain placed. In the alternative, the tubing 27 may be suspended in position in the container 11 by a suitable support 31 or other position maintaining means.

According to the invention, one end section 29 remains in the relatively cool air above the oil bath, while the other end section 30 is located in the relatively cool (approximately 175° F.) stratum of fluid below the heat band level 18. The tubing 27 is kept in the bath 10 until the central section 28 has been uniformly heated to the desired temperature of 350° F., as long as the end sections 29 and 30 remain relatively cool.

The method of the invention then provides that the tubing 27 may be withdrawn and bent or otherwise deformed on a conventional jig or other fixture of the type well-known in the art but, due to the selection of the levels 12 and 18 to control the range of the heating process, only the central section 28 which has been heated will deform to form the radius of the elbow, while the end sections 29 and 30 will retain their original shape to form the tangents of the elbow. As a result, the method and apparatus of the invention provide, among other things, that a length of PVC tubing or pipe may be bent in the middle to form an elbow to be used in electrical conduit or process piping, while the ends retain their original shape so that standard connectors may fit over them.

Figure 3:
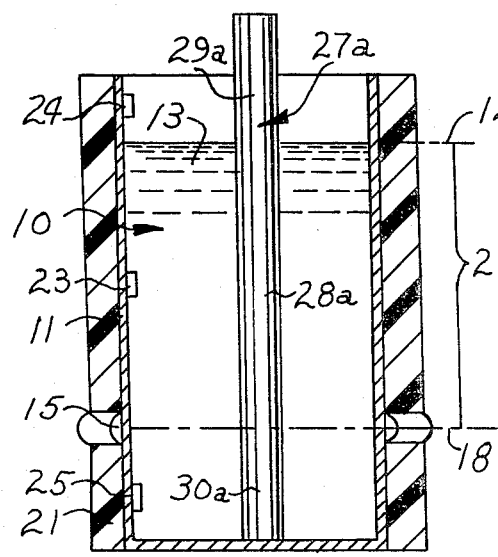
FIG. 3 is another sectional view of the apparatus of FIG. 2, with the levels adjusted to provide for a greater bend radius and shorter tangents.
Figure 4:
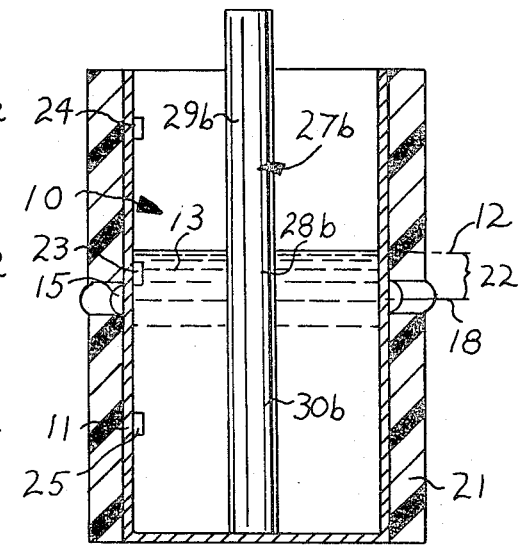
FIG. 4 is another sectional view of the apparatus of FIG. 2, with the levels adjusted to provide for shorter bend radius and longer tangents.

FIGS. 3 and 4 show how a variation of levels of the fluid and the head band can, in accordance with the method of the invention, provide elbows with shorter or longer bend radii and shorter or longer straight end distances or tangents. FIG. 3 depicts the another length of PVC tubing 27a identical to the tubing 27 of FIG. 2 inserted in the bath 10. However, the levels have been changed to provide for a larger bend radius and shorter tangents. To provide for shorter tangents, it is necessary to decrease the length of the end sections 30a and to lower the level 18 of the heat band until it is a distance above the bottom of the container equal to the length of the end section 30a. This is accomplished by removing the heat band 15 and reinstalling it at a lower level. To have a larger bend radius, it is necessary to increase the length of the central section 28a which is to be bent, and it is thus desirable to increase the distance between the level 12 of the oil and the level 18 of the heat band so that when the tubing 27a is inserted into the bath, the central section 28a is heated to 350° F. This can be done by the invention, as depicted in FIG. 3, by simply raising the level 12 of the fluid in the bath by pouring more fluid into the container 11 until the level of the fluid is sufficiently high. The tubing 27a can then be inserted until the central section 28a which is to be heated is within the stratum between the levels 12 and 18. The central section 28a is then heated to 350° F., while the shorter end sections 29a and 30a remain relatively cool, resulting in a longer central section being rendered susceptible to deformation with shorter end sections retaining their generally cylindrical shape.

If a smaller bend radius and longer tangents are desired, the invention as depicted in FIG. 4 can provide this by lowering the level 12 of the fluid and raising level 18 of the heat band and inserting a tubing 27b, with the result that the shorter distance middle section 28b is heated and rendered susceptible to deformation, while longer end sections 29b and 30b retain their generally cylindrical shape.

According to the method of the invention, the level 12 of the fluid can be raised or lowered, and the level 18 of the heat band can be lowered or raised, according to the lengths of the sections to be heated and of the sections to be left unheated, as long as the heat band level 18 remains lower than the fluid level 12, preserving the presence of the heated stratum 22 of fluid in accordance with the invention. The levels 12 and 18 can also be raised or lowered jointly or one level can be raised and the other lowered, as well as holding one level fixed and raising or lowering the other. This allows not only for heating sections of various distances by the same apparatus, but also allows the apparatus to be adjusted so that ends of various lengths will remain unheated. For example, referring to FIG. 3, it is possible that a longer bottom end section 30a may be desired, with the same length of central section 28a. If this is desired, it is preferable to raise both the levels 12 and 18, preserving the height of heated stratum 22 between the levels 12 and 18 but allowing for room in the bottom of the bath 10 for the increased distance of the unheated end section 30a. Similarly, it may be desirable to lower both levels 12 and 18 to allow for a shorter bottom end section, or to raise the level 12 and the level 18 to allow for relatively large bend radii and short tangents, or to lower the level 12 and raise the level 18 for relatively small bend radii and long tangents.

Figure 5:
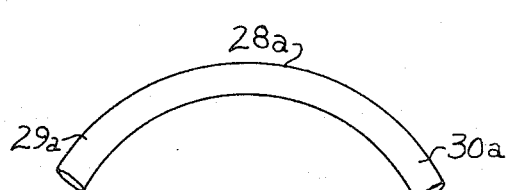
FIGS. 5 and 6 are views of elbows heated in the apparatus of FIGS. 3 and 4, respectively, in order to show how the variation of the levels can provide for various radii degrees and types of bends.
Figure 6:
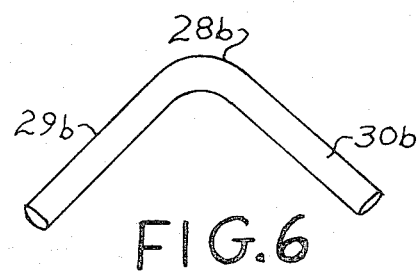

FIGS. 5 and 6 provide a basis for comparison between the different embodiments of the invention depicted in FIGS. 3 and 4 by depicting finished articles bent after being heated in the apparatus of FIGS. 3 and 4, respectively. FIG. 5 shows the PVC tubing 27a, which, after being heated in the apparatus of FIG. 3, is bent into an elbow having a central section 28a with a relatively large radius and short tangent sections 29a and 30a, while FIG. 6 shows a similar length of tubing 27b after being heated in the apparatus of FIG. 4, which, when bent, provides a central section 28b with relatively small radius and long tangent sections 29b and 30b.

The articles produced are not limited to FIGS. 5 and 6. Elbows of any bend radius and bend degree can be achieved by using longer lengths of pipe, higher and wider containers, and various levels of fluid and heat band placement. Other forms of deformation, such as expansion or attenuation of the middle sections, are also possible under the method of the invention as is deformation of solid rods and other types of thermoplastic lengths. The thermoplastic is not limited to PVC. ABS, polypropylene, and polyurethane are some examples of other thermoplastic material lengths of which may be bent using this method and apparatus.

The method and apparatus disclosed herein provide a stratified heat bath for use in the heating stage of thermoplastic deformation. It allows for heating of sections of thermoplastic lengths in order to render said lengths susceptible to deformation without heating the ends of said lengths, permitting the ends to retain their original shape. In the case of tubular lengths, such as PVC pipe, the invention provides for more rapid heating than is found in the prior art.

Although a preferred embodiment of this invention is illustrated, it is to be understood that various modifications and rearrangements of parts may be resorted to without departing from the scope of the invention as defined in the following claims.

What is claimed is:

1. A method of heating and bending lengths of thermoplastic material by heating central sections of said lengths without substantially heating end sections of said lengths, comprising the steps of at least partially filling a container to a first level with a fluid medium having a boiling point substantially higher than the softening point of the thermoplastic material, said medium being chemically inert with respect to the thermoplastic material and once heated retaining its heat for the period of time necessary to adequately heat the thermoplastic material, attaching an annular heat band to the container at a second level below said first level, enclosing at least a portion of said container in a thermally insulating material, applying heat to said container at said second level by activating said heating band, forming a stratum of heating fluid medium between said first level and said second level, inserting said length of thermoplastic material into said container from the top when said stratum of heated medium reaches a desired temperature until a section of said length to be heated is located substantially in said stratum with one end section of said length above said medium and the other end section in the medium below said stratum, withdrawing said length when it has been heated sufficiently and then promptly bending said length.

2. A method as set forth in claim 1, including the step of attaching heat-monitoring means between said first level and said second level.

3. A method as set forth in claim 1, including the step of attaching heat-monitoring means below said second level of the heat band.

4. A method as set forth in claim 1, including the step of attaching heat-monitoring means above said first level of the medium.

5. A method as set forth in claim 1, including attaching a heat band which is electrically powered and supplying electrical power to said heat band from an external electrical power source.

6. A method as set forth in claim 2, including suspending said lengths in position in the container with position-maintaining means.

7. A method for heating thermoplastic lengths as set forth in claim 1, including externally enclosing said container in a thermally insulating material only from the level of the band to the level of the medium in the container.

8. A method for heating thermoplastic lengths as set forth in claim 1, including adjusting said first level of the medium in the container in accordance with the distance of the section to be heated and the distance of the end sections to be left unheated, while maintaining said second level to the heat band below said first level.

9. A method for heating thermoplastic lengths as set forth in claim 1, including adjusting said second level of the heat band in accordance with the distance of the section to be heated and the distances of the end sections to be left unheated, while maintaining said second level below said first level of the medium.

10. A method for heating thermoplastic lengths as set forth in claim 1, including jointly raising or lowering said first and second levels in accordance with the distance of the section to be heated and the distances of the end sections to be left unheated, while maintaining said second level of the heat band below said first level of the medium.

11. A method of heating and bending lengths of thermoplastic material by heating central sections of said lengths without substantially heating the end sections of said lengths, comprising steps of at least partially filling a container with fluid to a first level, attaching an annular electric heating coil surrounded by a layer of electrically insulating material to the outside of the container at a second level below said first level, adjusting said first level in accordance with the distance of the section to be heated and the distances of the end sections to be left unheated, while maintaining said second level below said first level, adjusting said second level in accordance with the distance of the section to be heated and the distances of the end sections to be left unheated, while maintaining said second level below said first level, externally enclosing said coil and container in a thermally insulating material, applying heat to said oil at said second level by electrically activating said coil, attaching thermostats above said first level and between said first and second levels and below said second level, inserting a length of thermoplastic material into said container from the top when maintaining a stratum of heated oil between said first and second levels after the stratum arrives at the desired temperature until the central section of said length to be heated is located substantially in said stratum with one end section of said length above said first level of said oil and the other end section in the fluid below said second level of the heating coil, supporting said length in the container withdrawing said length when it has been heated sufficiently and then promptly bending said length.

* * * * *